US006176305B1

(12) United States Patent
Haglid

(10) Patent No.: US 6,176,305 B1
(45) Date of Patent: Jan. 23, 2001

(54) VENTILATOR SYSTEM AND METHOD

(75) Inventor: Klas C. Haglid, Wilmington, DE (US)

(73) Assignee: Building Performance Equipment Inc., Wilmington, DE (US)

( * ) Notice: Under 35 U.S.C. 154(b), the term of this patent shall be extended for 0 days.

(21) Appl. No.: 09/188,729

(22) Filed: Nov. 9, 1998

(51) Int. Cl.$^7$ ...................................................... F24F 7/08
(52) U.S. Cl. .......................... 165/231; 165/248; 165/250; 165/254; 165/292; 165/294; 165/54
(58) Field of Search .................................. 165/248, 249, 165/250, 251, 252, 54, 254, 231, 292, 294

(56) References Cited

U.S. PATENT DOCUMENTS

| 2,247,542 |   | 7/1941 | Anderson . |         |
|-----------|---|--------|------------|---------|
| 4,293,027 |   | 10/1981 | Tepe et al. . |      |
| 4,653,574 |   | 3/1987 | Quinlisk et al. . |   |
| 4,820,468 |   | 4/1989 | Hartig . |           |
| 4,841,738 | * | 6/1989 | Katsuki et al. | 165/254 |
| 5,024,263 |   | 6/1991 | Laine et al. . |     |
| 5,078,208 |   | 1/1992 | Urch . |             |
| 5,123,595 |   | 6/1992 | Doss . |             |
| 5,193,610 |   | 3/1993 | Morissette et al. . |  |
| 5,239,834 | * | 8/1993 | Travers | 165/248 |
| 5,348,077 |   | 9/1994 | Hillman . |         |
| 5,431,215 |   | 7/1995 | Davis . |            |
| 5,497,823 |   | 3/1996 | Davis . |            |

FOREIGN PATENT DOCUMENTS

| 3030778 | * | 2/1982 | (DE) | 165/54 |
| 3128684 | * | 2/1983 | (DE) | 165/54 |
| 0184887 | * | 6/1986 | (EP) | 165/54 |
| 0080644 | * | 7/1981 | (JP) | 165/54 |
| 0055338 | * | 4/1982 | (JP) | 165/54 |
| 1-318821 | * | 12/1989 | (JP) | 165/54 |
| 1083033 | * | 3/1984 | (SU) . | |

OTHER PUBLICATIONS

Yoshino, M. et al. "The Lossnay Penetration Type Total heat Exchanger"Mitsubishi Electric Engineer, Japan, No. 38 (Dec. 1973), pp. 24–27, (copy in 165/54).*

"Heat Recovery Ventilators Fresh Air" brochure—NuTone Co.—Cincinatti, OH (no date).

* cited by examiner

*Primary Examiner*—John K. Ford
(74) *Attorney, Agent, or Firm*—Kramer Levin Naftalis & Frankel LLP; Gregor N. Neff

(57) ABSTRACT

The ventilator system and method use a isolating heat exchanger to selectively transfer heat between exhaust air leaving an enclosed space and outside air entering the enclosed space. The system operates in three basic modes, under the control of a microprocessor-based controller which is responsive to the temperatures inside and outside of the enclosed space. In the heating mode, heat is transferred from the exhaust air to the outside air when the enclosed space requires heating. In the cooling mode, heat is transferred from the outside air to the exhaust air when the outside air temperature is higher than that in the enclosed space. In the supplemental cooling mode, heat transfer between the exhaust and outside air is reduced or eliminated when the outside air temperature is below the desired temperature in the enclosed space and cooling is required. In the heating mode, the heat exchanger is selectively heated when necessary to defrost it. A by-pass is provided for the introduction of outside air in order to avoid heating of the outside air by the exhaust air during the supplemental cooling mode of operation, and/or provide fresh air to the enclosed space without cooling the heat exchanger while it is being defrosted.

19 Claims, 3 Drawing Sheets

VENTILATOR SYSTEM AND METHOD

This invention relates to ventilator systems and methods, and particularly to ventilator systems and methods using isolating heat exchangers to exchange heat between exhaust air leaving an enclosed space, and outside air entering the building.

It is increasingly common to make modern homes and commercial buildings very air-tight in order to reduce heating and cooling costs. As a result, it has become increasingly necessary to bring fresh air into the building in order to avoid an extreme reduction of oxygen in the building, which can cause the illness or even death of the occupants.

Prior ventilator systems have been designed to use heat exchangers to transfer heat from the exhaust air to the outside air to pre-heat the outside air before it enters the building, thus saving energy and heating costs. This is useful in cold weather when the building must be heated.

In order to protect the health of the occupants, it is very desirable to prevent the air being exhausted from the enclosed space from mingling with the incoming outside air. Thus, often the heat exchangers which are used are those in which the flow of exhaust air is isolated from the flow of outside air through the heat exchanger. These are sometimes called "isolating" heat exchangers.

Other ventilator systems provide for heat transfer from the outside air to the exhaust air when the outside air temperatures are higher than the desired temperatures in the enclosed space. This cools the incoming air before it is further refrigerated to provide the ultimate desired temperature, thus reducing the load on the refrigeration system and reducing the cost of cooling.

Applicant has discovered a problem in that it is believed that prior ventilator systems are not efficiently operable throughout a complete range of outside and inside air temperature conditions. This reduces the utility of the prior ventilator systems and makes them less cost-effective than they might be.

Accordingly, it is an object of the present invention to provide a ventilating system and method in which the foregoing problems are eliminated or alleviated.

More particularly, it is an object of the invention to provide a ventilator system and method which can be utilized for essentially all ventilating conditions, and at essentially all times of the year.

It is an object of the present invention to provide a flexible ventilator system and method in which the mode of operation can be changed readily in response to changing climactic and interior space conditions.

It is a further object of the invention to provide such a system which is relatively inexpensive to manufacture, simple in construction, inexpensive to install and use, and reliable for long-term operation.

In accordance with the present invention, a ventilating system and method are provided in which an isolating heat exchanger is used for recovering energy while supplying outside air to an enclosed space during all weather conditions, by the use of inside and outside air temperature signals.

The invention also provides a ventilating system and method using an isolating heat exchanger in which two different modes of cooling are available; one in which the heat exchanger transfers heat from the incoming outside air to the cooler exhaust air, and another in which heat transfer between the incoming and outgoing air is temporarily eliminated in order to provide supplemental cooling when the outside air temperature is below the desired inside air temperature.

Additional cooling is provided by evaporatively cooling the exhaust air before it reaches the heat exchanger so as to greatly increase the temperature drop of the incoming outside air before it enters the enclosed space.

A further feature of the invention is the provision of a ventilating system and method using an isolating heat exchanger with supplemental cooling, without heat transfer between incoming and outgoing air, as well as heat transfer from the exhaust air to the incoming outside air during cold weather.

Another feature of the invention is the provision of a mode of operation to defrost the heat exchanger. This operation is accomplished by any one or more of the methods of reducing outside air flow; by-passing outside air flow around the heat exchanger; and heating the outside air before it reaches the heat exchanger.

The preferred ventilator system and method use a isolating heat exchanger to selectively transfer heat between exhaust air leaving an enclosed space and outside air entering the enclosed space. The system operates in three basic modes, under the control of a microprocessor-based controller which is responsive to the temperatures inside and outside of the enclosed space. In the heating mode, heat is transferred from the exhaust air to the outside air when the enclosed space requires heating. In the cooling mode, heat is transferred from the outside air to the exhaust air when the outside air temperature is higher than that in the enclosed space. In the supplemental cooling mode, heat transfer between the exhaust and outside air is reduced or eliminated when the outside air temperature is below the desired temperature in the enclosed space and cooling is required. In the heating mode, the heat exchanger is selectively heated when necessary to defrost it. A by-pass is provided for the introduction of outside air in order to avoid heating of the outside air by the exhaust air during the supplemental cooling mode, and/or provide fresh air to the enclosed space without cooling the heat exchanger while it is being defrosted.

The foregoing and other objects and advantages of the invention will be set forth in or apparent from the following description and drawings.

IN THE DRAWINGS

GENERAL DESCRIPTION

Figure 1:
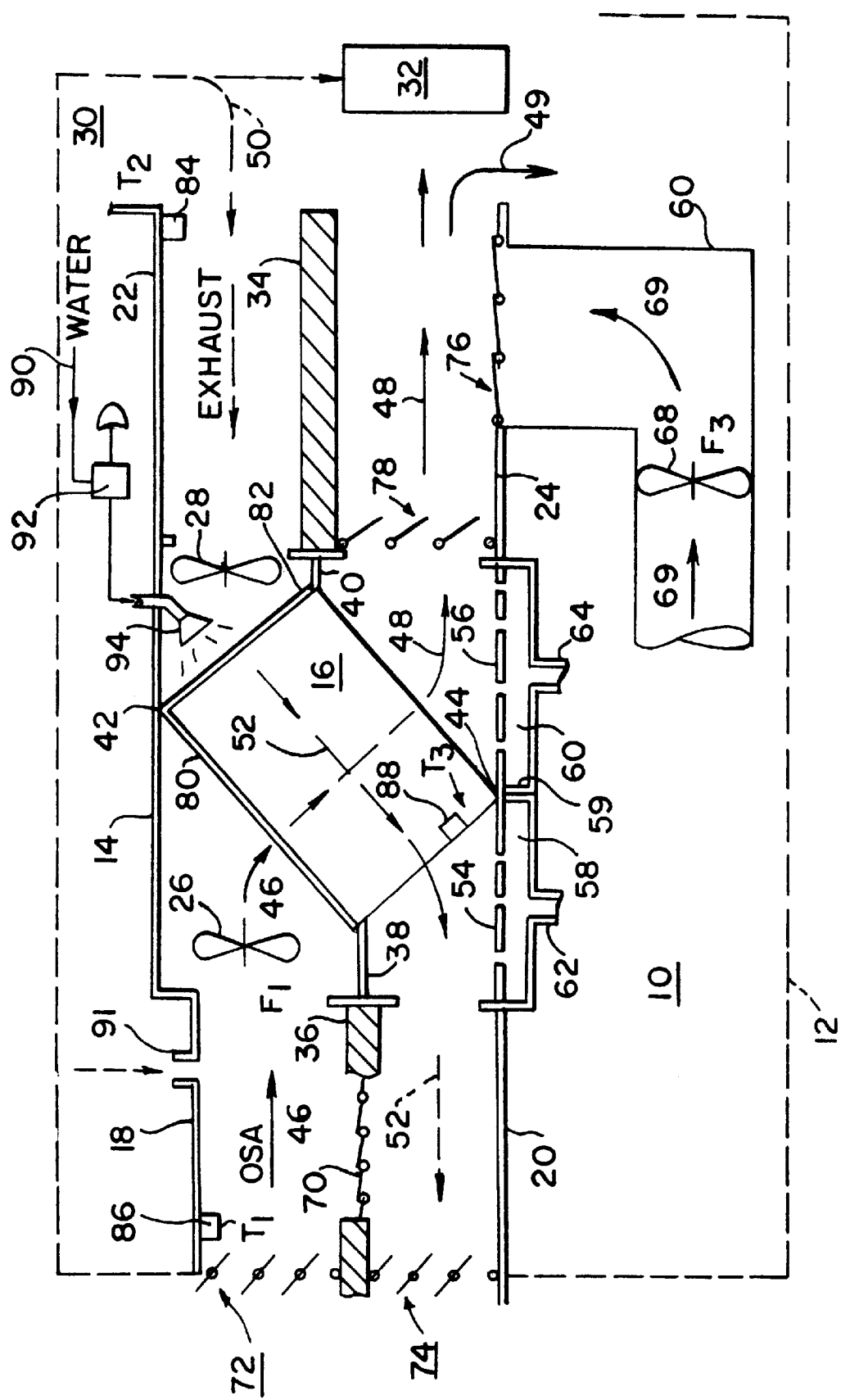
FIG. 1 is a schematic side-elevation and cross-sectional view of a ventilating system constructed in accordance with the present invention.

FIG. 1 shows the ventilating system 10 of the present invention in schematic form.

The ventilating system 10 is in use to provide ventilation to an enclosed space indicated schematically by the dashed line 12. This enclosed space can be a residence, a business office, a skyscraper or other type of enclosed space.

The ventilating system 10 includes a housing 14 in which is mounted a heat exchanger 16, an exhaust air fan 28, and an outside air fan 26.

The heat exchanger 16 is mounted in the housing 14, tilted as shown in FIG. 1, with its upper and lower edges 42 and 44 sealed to the top and bottom walls of the housing, respectively, and with the other corners of the heat exchanger attached with sealing members 38 and 40 to the side walls of the housing, also so as to provide an air seal between adjacent sides of the heat exchanger.

The unit described so far is supplied as a free-standing module. Attached to it, as in a typical installation, is an outside air inlet duct 18 and an exhaust air outlet duct 20. Both of the ducts 18 and 20 communicate with the ambient air outside of the enclosed space 12.

Attached at the other end of the housing 14 are an exhaust inlet duct 22 and an outside air outlet duct 24. The mounting of the heat exchanger 16 in the housing, with the seals at its four corners, provides two isolated air flow paths through the heat exchanger.

One path is shown by arrows 46 and 48 extending from the outside air inlet duct 18 downwardly and to the right and out through the duct 24, in the direction shown by the solid arrows through the heat exchanger 16.

The other flow path is from the exhaust inlet duct 22 through the heat exchanger 16 in the direction of the arrow 52 and out through the exhaust outlet duct 20, as shown by the dotted arrows passing through the heat exchanger in FIG. 1.

The flow paths taken by the outside air and the exhaust air through the heat exchanger 16 are isolated from one another so that the two air streams do not intermingle, thus helping to protect against contamination of the incoming outside air.

The outside air flowing through the duct 24 flows through other ducts (not shown) and usually is delivered to one of three locations. Either it is mixed with return air entering the system at 30 and delivered to a heating/refrigeration unit 32 to either heat or cool the air, or it is delivered directly into the enclosed space 12, as indicated by the arrow 49.

It should be understood that in ventilating some spaces, such as in hospitals and other critical environments, it is desired to use 100% outside air for heating or cooling in the enclosed space, thus maximizing the protection against air contamination. In such circumstances, the outside air is not mixed with the return air.

Temperature sensors are provided at 84 and 86, the inlet to the exhaust duct 22 and the inlet to the outside air duct 18, respectively, or at other suitable locations. The temperature sensor 84 senses the actual indoor temperature, and provides a corresponding electrical signal. Similarly, the temperature sensor 86 senses the outside air temperature and provides a corresponding signal.

These signals are delivered to the microprocessor-based controller shown in FIG. 4, which uses the temperature signals to control the operation and to selectively control the exchange of heat between the exhaust and outside air streams and other functions to be described below.

Figure 5:
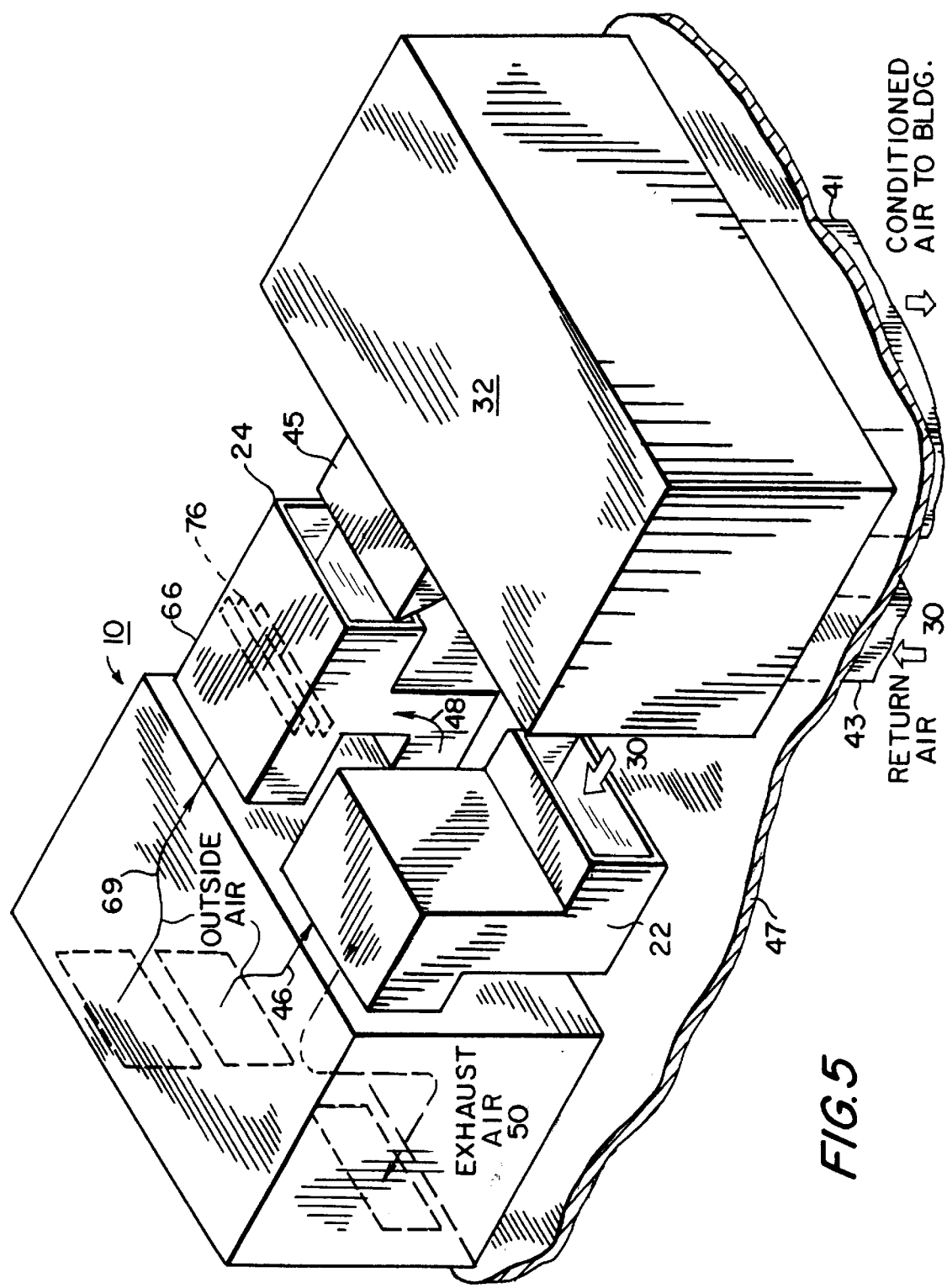
FIG. 5 is a perspective, partially exploded view of a roof-top installation of the ventilator of the present invention.

FIG. 5 is a perspective view of a typical installation of the ventilating system 10 and a heating/refrigeration unit 32 on the roof 47 of a building. The unit 10 is shown separated from the unit 32 for the sake of clarity in the drawings.

Return air from the building returns to the unit 32 through the duct 43 and part or all of it flows through the exhaust conduit 22, through the heat exchanger (not shown in FIG. 5) and out through the exhaust outlet.

Outside air enters the unit 10 and flows either through the heat exchanger along path 46, or through a by-pass 66 and gravity louvers 76 (to be described below) to the outside air duct 24, which is connected to the unit 32 through a fitting 45.

Heating Mode

The first mode of operation to be described is one in which heating of the enclosed space is provided by a furnace or other heating means. Usually, the outside air temperatures are below 50° F. when heating of the interior space in most commercial buildings is required. However, the outside air temperature at which heating is first needed can be considerably lower, e.g., 35° F., for buildings with large internal heat sources, such as large banks of computers or intense lighting, or solar energy-absorbing surfaces, etc. Of course, this temperature also can be higher, where the internal heat generation is at a low level.

In residential buildings, the outside air temperature at which heating is first required usually is considerably higher, say 60° F. or 65° F., because internal heat generation usually is lower than in most commercial buildings.

As it will be described below in connection with FIG. 4, the operation of the ventilating system is controlled by a programmed microprocessor 96. The heating mode is started when the outside air temperature reaches a pre-determined level which can be different for each building or space within a building. For this reason, the microprocessor is of the field-programmable variety so that the heating mode start point can be set independently for each building.

The fans 26 and 28 are variable-speed fans. During the heating mode of operation, preferably the fans 26 and 28 operate at or near maximum speed, thus providing preheating of the outside air entering the enclosed space so as to reduce the cost or heating the space.

Of course, the speeds of the fans 26 and 28 can be varied as desired to increase or decrease the corresponding air flows as required by the enclosed space.

Supplemental Cooling Mode

In accordance with the present invention, a supplemental cooling mode of operation of the ventilating system is provided in which outside air is taken in but heat transfer between the exhaust air and the outside air is reduced or eliminated so that the cool air will not be heated substantially by the exhaust air and will be supplied at or near the outside temperature for use in cooling the interior of the enclosed space.

Usually, this mode of operation occurs when the temperature in the enclosed space, as sensed by the temperature sensor 84, is above a desired level, e.g., 70° F., so that cooling is needed, while the outside air temperature is below the desired level. Typically, the supplemental cooling mode will most often be desired when the outside air temperature is in the 50° F. to 70° F. range.

By this means, the natural cooling potential of the outside air can be used to cool the enclosed space, either with or without the use of refrigeration or other cooling.

This mode of operation is particularly advantageous because many commercial buildings require cooling when outside temperatures are relatively low. For example, because of the use of substantial amounts of heat-generating computers or other office machines, indoor lighting, groups of people, solar heating through building windows, etc., many commercial buildings have a heat build-up which is not dissipated by only moderately cool outside temperatures, so that cooling is required.

During this mode of operation, heat exchange between the exhaust air and outside air is reduced or eliminated by one of several different methods. Only the simplest one will be described here. That is to simply slow or stop the exhaust fan 28 so that either less or no exhaust air will pass through the heat exchanger and heat the incoming outside air. Other methods will be described below.

Cooling Mode

This mode of operation is used when the outside air temperature is above that desired for the enclosed space. When the weather outside is hot, and the air exhausted from the enclosed space is cooler than that coming in from outside, the exhaust air cools the outside air in the heat exchanger 16 before it enters the enclosed space. If necessary, the outside air then can be sent to a refrigeration unit 32 to be cooled further. This can significantly reduce the load on the refrigeration unit and reduce the cost of hot weather air conditioning. Some de-humidification of the outside air also is accomplished.

As during the heating mode, preferably, both fans 26 and 28 are operated at maximum speed.

Outside Air By-Pass

In accordance with another aspect of the present invention, a by-pass conduit 66 is provided for introducing outside air into the enclosed space 12 under selected conditions. By-pass conduit 66 also has its own independently operable variable speed fan 68 for delivering outside air into the outside air duct 24.

One of the conditions in which the by-pass duct is useful is during the supplemental cooling mode of operation described above. During this mode, heat transfer between the exhaust air and the outside air can be prevented without stopping the exhaust fan 28 simply by slowing or stopping the fan 26 and running the fan 68. This allows warm interior air to be exhausted and cool outside air to be introduced, with less or no heating of the outside air.

Another advantage of the invention is that the by-pass can be used for two different functions; it can be used as a supplemental cooling mode by-pass, as described above, and in defrosting the heat exchanger.

Louver System

The optional louver system for use in conjunction with the by-pass, and also for other functions, now will be described.

A set of gravity-type louvers is provided at 76 at the exit of the by-pass 66 into the duct 24.

A set of motorized louvers 70 is provided in a septum or wall 36 separating the ducts 18 and 20.

Two other motorized louvers 72 and 74 are provided, respectively, at the entrances to the ducts 18 and 20.

Additional gravity-operated louvers 78 are provided at the outlet from the housing 14 into the duct 24.

Gravity-operated louvers open in response to an air pressure differential in one direction, but close either under gravity or pressure in the opposite direction. In general, it is preferred to use gravity-type louvers instead of motor-driven louvers, wherever possible because they tend to operate smoothly over long periods of time without significant maintenance and also are less complicated and expensive. Gravity louvers work either in a vertical or horizontal orientation.

The operation of the louvers during various different phases of the operation of the system will be described below.

Defrost Mode

The exhaust air from the enclosed space during the cooling mode has a certain level of humidity, say, 55% or thereabouts. When the warm, humid air from the interior of the enclosed space passes through the cold heat exchanger, moisture condenses from the air and condensate and water runs downwardly out of the heat exchanger and through holes in perforated floor panels 54 and 56 of the housing 14 to drip pans 58 and 60 with drains 62 and 64 for removing the accumulated water. The drip pans are isolated from one another by a septum or wall 59 in order to preserve the isolation of the outside air path from the exhaust air path.

When the outside air temperature is very low, the water accumulating in the heat exchanger starts to freeze and clog up the passages in the heat exchanger. This reduces the heat exchange efficiency of the heat exchanger, increases the pressure drop across the heat exchanger, and can totally disable it. Therefore, means are provided for defrosting the heat exchanger when freezing conditions are detected.

Freezing conditions are detected preferably by means of a temperature sensor 88 mounted near the lower portion of the heat exchanger where ice tends to accumulate first. When the temperature sensed by the sensor 88 reaches freezing (32° approximately), the temperature sensor sends a signal to the control system which starts the defrost operation.

In its simplest form, the defrost operation comprises simply reducing the speed of the outside air fan 26 while leaving the speed of the exhaust fan 28 at its original maximum speed, thus reducing the cooling of the heat exchanger and allowing the warmth of the exhaust air to melt the ice in the heat exchanger and bring its temperature up to above the freezing level. When the temperature sensed by the sensor 88 rises to the desired level again, the speed of the fan 26 is restored to its previous level.

This operation is repeated as often as necessary to prevent icing of the heat exchanger.

The simple defrosting method described above is adequate in many circumstances. However, more heating of the heat exchanger may be required in order to defrost it. If so, the intake of outside air can be stopped completely for a time until the temperature of the heat exchanger rises.

In accordance with another aspect of the invention, if it is desired to maintain the flow of outside air into the enclosed space at a steady level, even during defrost, then the fan 68 in the by-pass duct 66 can be turned on to bring in outside air without passing it through the heat exchanger, to either supplement the air brought in by the slowed fan 26, or to replace it entirely.

It is possible that further heating of the heat exchanger beyond that provided by the means described so far would be necessary. In such cases, by closing the louvers 72 and 74 and opening the louvers 70, the exhaust air is re-circulated back through the outside air flow passages and into the enclosed space, thus using the residual heat in the exhaust air for further heating and defrosting. Thus, exhaust air exiting the heat exchanger can pass upwardly from conduit 20 into conduit 18, through the outside air passages in the heat exchanger, and out through the duct 24 back into the enclosed space.

Even further heating of the heat exchanger can be provided by other means such as the introduction of steam into the inlet 91 in the duct 18 so as to preheat the outside air before it reaches the heat exchanger. Of course, this requires additional energy and should be restricted to uses in which it is considered most beneficial, such as in hospitals and other institutions. Other heat sources also can be used to supply the necessary supplemental heat.

When the by-pass fan 68 is operated, the air pressure it produces lifts the louvers 76 and allows air to pass into the duct 24. If there is no air flow created by the fan 26 through the louvers 78, the back pressure produced by the fan 68 closes the louvers so that outside air does not flow backwardly through the heat exchanger.

Means other than a temperature sensor can be used to detect freezing conditions. For example, air pressure sensors to detect the change in pressure caused by ice formation are known in the prior art can be used, if desired.

Evaporative Cooling

During the cooling mode of operation, it is preferred to use a relatively low-cost method of further reducing the temperature of incoming outside air so as to decrease the cooling load on the refrigeration system. This is provided by an evaporative cooling system including a spray nozzle 94 (FIG. 1) and a solenoid-operated valve 92 selectively supplying pressurized water from the supply line 90 to the spray nozzle 94. The spray 94 sprays water into the exhaust air before it enters the heat exchanger 16.

Preferably, the water from the spray nozzle 94 is sprayed onto an air-permeable membrane 82 which covers the exhaust air entrance to the heat exchanger.

Figure 2:
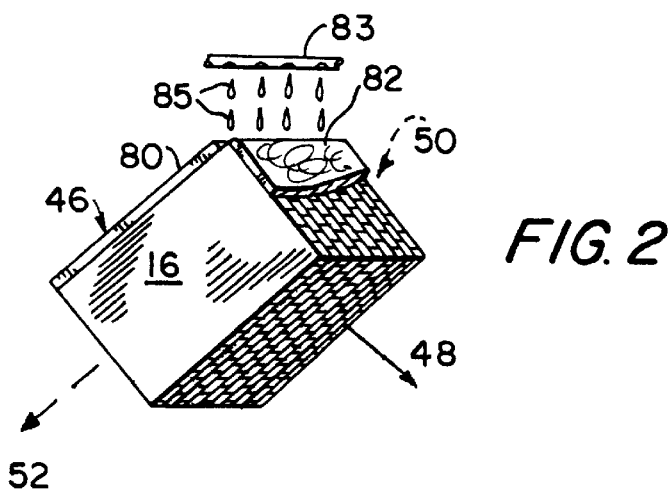
FIG. 2 is a perspective view of a heat exchanger used in the system shown in FIG. 1.

FIG. 2 is a perspective view of the heat exchanger 16 showing the membrane 82 (broken away). The membrane 82 preferably comprises a thin mat of synthetic fibers such as those used in ordinary air filters so as to enhance the evaporation of the water in the exhaust air stream to give evaporative cooling of the exhaust air. Such a mat is made of fibers which do not deteriorate due to prolonged contact with water and the air which impinges on the membrane.

Alternatively, as shown in FIG. 2, water can be dripped from one or more pipes 83 with holes 85 in it to drip water onto the membrane. The water migrates downwardly through the membrane under the force of gravity.

Any water which accumulates in the heat exchanger due to the water spray will drain out through the bottom of the heat exchanger and into the drip pans 58 and 60, the same as condensate.

Evaporative cooling can reduce the temperature of the incoming air by a very significant amount, and is not very costly in terms of either materials or energy required. Therefore, it is a very cost-effective way of preconditioning the outside air to reduce the energy requirements of the refrigeration system. Again, as with other operations of the system, the evaporative cooling equipment preferably is turned on in response to the detection of an outside air temperature which is greater than the desired inside air temperature by a certain minimum amount.

For example, the minimum temperature difference in question might be 3 to 10 degrees Farenheidt. Thus, if the outside temperature were 72 degrees and the desired space temperature is 70° F. and the minimum differential is 10 degrees, the evaporative cooling system would not operate. When the outside air temperature reaches 80 degrees, the evaporative cooling system will turn on and operate continuously until the outside air temperature drops below the desired level.

Control System

Figure 4:
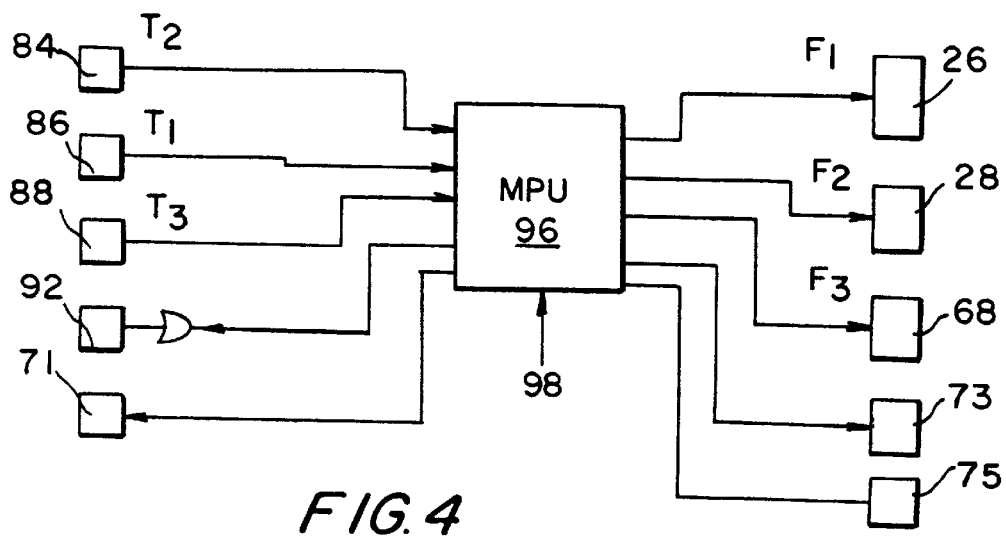
FIG. 4 is a schematic diagram of a control circuit for controlling the operation of the system shown in FIG. 1.

FIG. 4 shows schematically the control circuit of the ventilation system of the present invention. A microprocessor 96 is provided and programmed so as to control both the turning on and off and the speed of each of the fans 26, 28 and 68 in response to the signals sent to the microprocessor by the temperature sensors 84, 86 and 88. Operating signals are sent by the microprocessor also to the louver motors 71, 73 and 75 to operate the powered louvers and the solenoid valve 92 to start and stop the water spray for the evaporative cooling system described above.

As noted above, it is preferred that the microprocessor be field-programmable to allow the variation of set-points, etc. for each installation.

The microprocessor also is programmed to have certain "dead-bands" around the various control points to prevent excessive "hunting". Preferably, the dead-bands also are field-programmable in order to enable the customization of the system for a particular enclosed space.

For example, a dead-band of 3° F. to 5° F. or more around each set-point can be beneficial. Manual over-ride also can be provided to enable adjustments for special circumstances. Automatic control of some set-points also can be provided. For example, the switch-over from supplemental cooling mode to heating mode can be delayed, even though a sudden cold-snap reduces the outside air temperature to below the heating mode set-point, if the inside air temperature is still high enough to require cooling.

Heat Exchanger

The heat exchanger 16 has a rectangular shape and preferably is made of plastic. It is preferred that the heat exchanger be of the type shown in U.S. Pat. No. 4,820,468 to M. J. Hartig, which is sold by the Hartig Company, Wilmington, Del.

Figure 3:
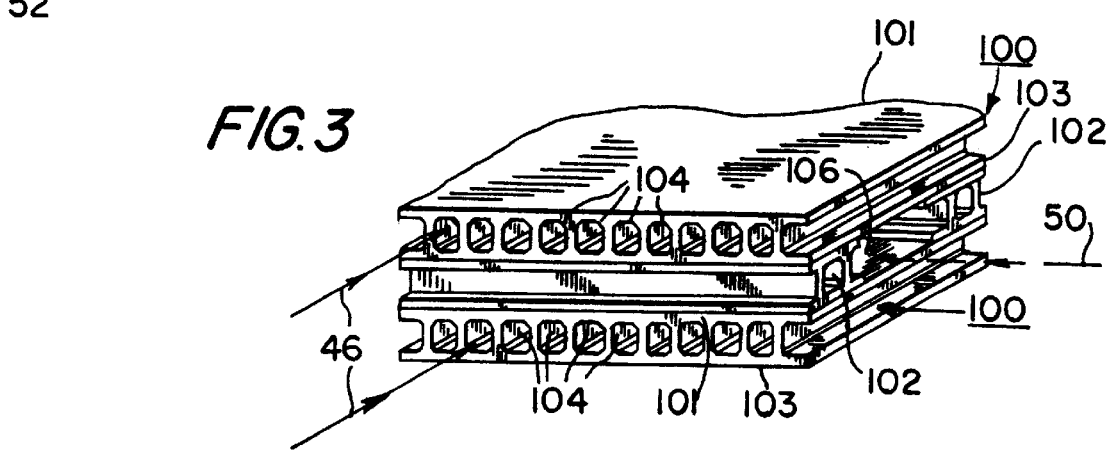
FIG. 3 is a perspective, broken away enlarged and partially schematic view of a portion of the heat exchanger shown in FIG. 2.

The structure of this heat exchanger is illustrated in FIGS. 2 and 3, and particularly in FIG. 3. The heat exchanger structure comprises a plurality of plastic extrusions 100 with closely spaced parallel passageways 104 separated by square extruded channel members 102 extending perpendicular to the direction of the passageways 104. Although only two of the extrusions 100 and a pair of channel members are shown in FIG. 3, for the sake of simplicity in the drawings, it should be understood that there are many extrusions and channel members in the typical heat-exchanger.

Each extrusion 100 comprises a solid top sheet 101 and a solid bottom sheet 103 with multiple vertical walls forming the passageways 104. Thus, crossed air flow paths are formed by the passageways 104, on the one hand, and the spaces 106 between the channel members and the hollow interiors of the members 102. These crossed flow paths are isolated from one another by the solid sheets 101 and 103. The extrusions 100 and 102 are heat-welded together to form a strong, lightweight corrosion-resistant heat exchanger.

The exhaust air preferably flows through the larger passageways 106, as indicated by the arrow 50, and the outside air flows through the passageways 104. This arrangement is preferred because the exhaust air may have entrained water droplets and condensation and ice may form in the exhaust air passageways so that the larger passageways will remain operative for heat transfer over a wider range of operating circumstances than if the smaller passages were used. Although condensation also will occur when hot, humid outside air is cooled in the heat exchanger, it is believed that the larger passageways will better suit the conduct of exhaust air.

The material of which the heat exchanger 16 is made preferably is polyethylene or polypropylene, or other plastic materials which also are impervious to deterioration under prolonged contact with water and flowing air.

Equivalent heat exchangers also can be used in the practice of the invention. For example, isolating heat exchangers made of various metals can be used, as well as heat pipes whose ends are isolated from one another with one end in the outside air flow and the other in the exhaust air flow. Hydronic heat exchangers with liquid working fluids also can be used.

The plastic heat exchanger described above is advantageous over the usual metal heat exchanger, even though the heat conductivity of the plastic is considerably lower than that of the metal. The plastic lasts a very long time without corroding and is considerably less expensive than metal. Also, the plastic heat exchanger is less expensive to manufacture than metal heat exchangers. The added volume required for the plastic heat exchanger to exchange the same amount of heat as a metal heat exchanger is more than offset by the foregoing advantages.

The plastic heat exchanger is believed to be particularly advantageous when used with evaporative cooling because any scale which forms from the water spray can be broken free relatively easily by flexing the heat exchanger.

The above description of the invention is intended to be illustrative and not limiting. Various changes or modifications in the embodiments described may occur to those skilled in the art. These can be made without departing from the spirit or scope of the invention.

What is claimed is:

1. A method of ventilating an enclosed space using an air handling system including an isolating heat exchanger for conducting exhaust air from said enclosed space and outside air into said enclosed space and exchanging heat between said exhaust air and said outside air while isolating the flows of said outside and exhaust air from one another, an enclosed space air temperature sensor, an outside air temperature sensor, a first fan to move said exhaust air through said heat exchanger, a second fan to move said outside air through said heat exchanger, and a programmed controller for controlling the flow of said exhaust air and said outside air and the heat transfer therebetween, said method comprising:
    (a) during a first cooling mode, causing heat to be transferred from said outside air to said exhaust air when the outside air temperature is greater than a desired enclosed space temperature;
    (b) during a second cooling mode, reducing or eliminating the transfer of heat from said exhaust air to said outside air through said heat exchanger when said outside air temperature is lower than said desired enclosed space temperature, and said space temperature is greater than said desired space temperature.

2. A method as in claim 1 including the step of, during a first heating mode, utilizing said controller in causing heat to be transferred from said exhaust air to said outside air when said outside air temperature is at a temperature which is below said desired space temperature by at least a pre-determined amount.

3. A method as in claim 2 in which said controller is field-programmable, and including the step of programming said controller to set said pre-determined amount in the field for each installation of the ventilator system.

4. A method as in claim 2 in which said air handling system includes a sensor for detecting freezing conditions in said heat exchanger, and including the step of utilizing said controller in causing the heating of said heat exchanger to alleviate said freezing conditions.

5. A method as in claim 4 in which the heat exchanger heating step includes reducing the flow of sub-freezing outside air through said heat exchanger.

6. A method as in claim 4 in which the heat exchanger heating step includes re-circulating said exhaust air through said heat exchanger in the path otherwise taken by said outside air.

7. A method as in claim 4 in which the heat exchanger heating step includes one or more steps selected from the group consisting of; reducing the flow of outside air through said heat exchanger while maintaining the flow of exhaust air therethrough; recirculating said exhaust air through said heat exchanger; and applying heat from a heat source to said heat exchanger.

8. A method as in claim 1 including the step of using evaporative cooling during said first cooling mode to cool said exhaust air prior to its entering said heat exchanger.

9. A method as in claim 8 in which said evaporative cooling step includes introducing liquid water into said exhaust air, in which said heat exchanger is made of a material substantially impervious to the flow of liquid water through it.

10. A method as in claim 9 in which said heat exchanger is tilted so as to have the entrance for exhaust air at a higher elevation than the exit for exhaust air, in which said water is introduced so that water which is not evaporated runs into said entrance and out of said exit under gravity flow.

11. A method as in claim 9 in which the walls of the air flow passages through said heat exchanger have corrosion-resistant plastic surfaces.

12. A method as in claim 8 in which said evaporative cooling comprises one or more steps selected from the group consisting of; spraying water into said exhaust air; wetting a membrane with water and contacting said exhaust air with said membrane; and spraying water into said exhaust air and onto a membrane contacting said exhaust air.

13. A method as in claim 1 in which said air handling system includes a by-pass duct and fan for selectively introducing outside air into said enclosed space without flowing through said heat exchanger; and including the step of operating the by-pass fan to introduce outside air into said space during said second cooling mode.

14. A method as in claim 13 including the step of operating said by-pass fan during defrosting of said heat exchanger.

15. A method as in claim 1 in which the step of substantially eliminating the transfer of heat during said second cooling mode is performed by reducing or eliminating the flow of exhaust air through said heat exchanger while flowing said outside air therethrough.

16. A method as in claim 15 in which said step of eliminating or reducing the flow of exhaust air through said heat exchanger comprises stopping the running of said first fan or substantially reducing the rate of air flow it produces relative to the rate of air flow produced by said second fan.

17. A method of ventilating an enclosed space using an air handling system including an isolating heat exchanger for conducting exhaust air from said enclosed space and outside air into said enclosed space and exchanging heat between said exhaust air and said outside air while isolating the flows of said outside and exhaust air from one another, an enclosed space air temperature sensor, an outside air temperature sensor, a first fan to move said exhaust air through said heat exchanger, a second fan to move said outside air through said heat exchanger, and a programmed controller for controlling the flow of said exhaust air and said outside air and the heat transfer therebetween, said method comprising:
    during a heating mode, causing heat to be transferred from said exhaust air to said outside air when said outside air temperature is at a first temperature which is below a desired space temperature by at least a pre-determined amount, and
    during a cooling mode, reducing or eliminating the transfer of heat from said exhaust air to said outside air through said heat exchanger when said outside air temperature is above said first temperature but below said desired temperature, and said space temperature is greater than said desired space temperature.

18. A method of ventilating an enclosed space using an air handling system including an isolating heat exchanger for conducting exhaust air from said enclosed space and outside air into said enclosed space and exchanging heat between said exhaust air and said outside air while isolating the flows of said outside and exhaust air from one another, an enclosed space air temperature sensor, an outside air temperature sensor, a first fan to move said exhaust air through said heat exchanger, a second fan to move said outside air through said heat exchanger, and a programmed controller for controlling the flow of said exhaust air and said outside air and the heat transfer therebetween, said method comprising: cooling said enclosed space by substantially eliminating the transfer of heat from said exhaust air to said outside air through said heat exchanger when said outside air temperature is below a desired space temperature but above a temperature at which heating of the enclosed space is required, and said space temperature is greater than said desired space temperature.

19. A method as in claim 18 in which the transfer of heat from said exhaust air is reduced or eliminated by one of more of the steps consisting of: by-passing outside air around said heat-exchanger; and reducing or eliminating the flow of exhaust air through said heat exchanger.

* * * * *